(12) United States Patent
Dimitrov

(10) Patent No.: US 11,762,097 B2
(45) Date of Patent: *Sep. 19, 2023

(54) SENSOR PLACEMENT TO REDUCE BLIND SPOTS

(71) Applicant: TOYOTA RESEARCH INSTITUTE, INC., Los Altos, CA (US)

(72) Inventor: Velin Dimitrov, Arlington, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,321

(22) Filed: Nov. 14, 2022

(65) Prior Publication Data

US 2023/0071443 A1 Mar. 9, 2023

Related U.S. Application Data

(63) Continuation of application No. 16/903,361, filed on Jun. 16, 2020, now Pat. No. 11,531,114.

(51) Int. Cl.
*G01S 17/931* (2020.01)
*G05D 1/02* (2020.01)
*G01S 17/89* (2020.01)

(52) U.S. Cl.
CPC ............ *G01S 17/931* (2020.01); *G01S 17/89* (2013.01); *G05D 1/0251* (2013.01); *G05D 2201/0209* (2013.01)

(58) Field of Classification Search
CPC ..... G01S 17/931; G01S 17/89; G05D 1/0251; G05D 2201/0209
See application file for complete search history.

(56) References Cited

U.S. PATENT DOCUMENTS

| | | | | |
|---|---|---|---|---|
| 8,947,531 B2* | 2/2015 | Fischer | ................... | G01S 17/86 348/148 |
| 9,488,727 B2* | 11/2016 | Wehling | ............... | G01S 7/52004 |
| 9,855,894 B1* | 1/2018 | Khorasani | ............... | G06T 15/08 |
| 11,035,958 B2* | 6/2021 | Feng | ........................ | G06T 5/005 |
| 11,280,897 B2* | 3/2022 | Kunz | ......................... | G01S 7/40 |
| 2015/0192677 A1* | 7/2015 | Yu | ............................ | G01S 17/89 356/5.01 |
| 2020/0011989 A1* | 1/2020 | Takahashi | ............. | G01S 13/867 |

(Continued)

*Primary Examiner* — Vivek D Koppikar
*Assistant Examiner* — Kathleen B Ward
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods for imaging may include: receiving a first point cloud from a first LiDAR sensor mounted at a first location behind a vehicle grille, the first point cloud representing the scene in front of the vehicle, wherein as a result of the grille the scene represented by the first point cloud data is partially occluded with a first pattern of occlusion; receiving a second point cloud from a second LiDAR sensor mounted at a second location behind the vehicle grille; combining the first and second point clouds to generate a composite point cloud data set, wherein the first LiDAR sensor is located relative to the second LiDAR sensor such that when a point cloud data for the first optical sensor and the second optical sensor are combined, the first pattern of occlusion is at least partially compensated; and processing the combined point cloud data set.

17 Claims, 7 Drawing Sheets

(56) References Cited

U.S. PATENT DOCUMENTS

2020/0408887 A1* 12/2020 Zeng .................. G01S 17/87
2021/0157002 A1*  5/2021 Yangel ............... B60W 40/00
2021/0199783 A1*  7/2021 Voynov .............. G01S 17/10
2021/0311183 A1* 10/2021 Marsh ................ B60W 30/08

* cited by examiner

SENSOR PLACEMENT TO REDUCE BLIND SPOTS

CROSS-REFERENCE TO RELATED APPLICATIONS

This application is a continuation of and claims the benefit of U.S. patent application Ser. No. 16/903,361 filed Jun. 16, 2020, which is hereby incorporated herein by reference in its entirety for all purposes.

TECHNICAL FIELD

The present disclosure relates generally to vehicle assistance systems, and in particular, some implementations may relate to sensor placement for object detection.

DESCRIPTION OF RELATED ART

Autonomous vehicle technology is becoming more commonplace with the introduction of new vehicles each model year. While widespread adoption of fully autonomous vehicles is only now becoming visible on the horizon, autonomous vehicle technology is gaining increasing popularity for assisted driving and other semi-autonomous vehicle operation. Developers within organizations such as major original equipment manufacturers, tier 1 suppliers, startup companies and others, are racing to develop autonomous vehicle and advanced driver assistance systems (ADAS) technologies.

Deploying autonomous vehicles (AVs) is a technologically complex challenge. Among other challenges, AVs need to accurately locate stationary objects and detect and track moving objects such as vehicles, pedestrians, and cyclists in real time. In autonomous driving, accurately estimating the state of surrounding obstacles is critical for safe and robust path planning. However, this perception task is difficult, particularly for generic obstacles, due to appearance and occlusion changes. Perceptual errors can manifest as braking and swerving maneuvers that can be unsafe and uncomfortable.

Conventional solutions for pedestrian and other object detection and warning/avoidance use sensors mounted on the front of the vehicle along with tools to analyze the sensor information. Such systems may alert the driver to the presence of a pedestrian (including joggers, cyclists, etc.) and alert the driver of the presence of the pedestrian in the path of the vehicle or in the case where the pedestrian is on a trajectory to put it in the path of the vehicle. Safety systems may use this information to not only alert the driver, but to also take measures to avoid a collision such as to automatically brake the vehicle or to steer the vehicle where possible to safely avoid the pedestrian.

The sensors may include ultrasonic or radar sensors to detect objects in the path of the vehicle and to determine their position and range. Some arrangements may include image sensors such as cameras to detect and identify objects. Cameras are popular solutions because they are relatively low cost tools and they can be used to obtain color, texture and contour features, which information can be used to classify objects (e.g., to help identify pedestrians). Other solutions use LiDAR sensors, which, although more costly, offer the benefit of being able to acquire distance and three-dimensional information at relatively long ranges. Additionally, LiDAR is not typically constrained by illumination conditions as are cameras.

In operation to detect and classify pedestrians or other objects, LiDAR acquires point clouds in the data from those point clouds may then be projected onto a grid. In some implementations, this information can be used to create a birds-eye-view representation of the scene surrounding the vehicle. Multisensor fusion schemes have combined information from cameras and LiDAR sensors to provide more robust solutions. Furthering the use of sensor fusion, image and point cloud information has been combined with other sensors such as impact sensors.

Conventional solutions mount LiDAR sensors at locations of the vehicle where they will have an unobstructed view of the surroundings. For example, roof mounted LiDAR sensors are desirable for autonomous vehicles because they can afford a 360° field of view around the vehicle. Bumper-mounted LiDAR sensors are also popular because they can provide unobstructed view toward the front and rear of the vehicle. Because pedestrian detection and avoidance is generally concerned with objects within the forward path of the vehicle, front-bumper-mounted LiDAR sensors have been used for this purpose. LiDAR sensors can be somewhat bulky and may be considered unsightly if mounted on the exterior of the bumper. Bumper mounted LiDAR sensors may also interfere with safe operation of vehicle systems such as, for example, bumper-centric pedestrian production systems appearing in newer vehicles. However, considerable issues may arise when mounting LiDAR sensors where they are not readily visible on the exterior of the vehicle because obstructions can lead to blind spots in the point clouds thereby hindering performance of object detection and tracking systems.

BRIEF SUMMARY OF THE DISCLOSURE

Various embodiments of the disclosed technology relate to placement of two or more LiDAR sensors are disposed behind the grille of a vehicle. The grille causes an interference pattern in the resulting point cloud data for each LiDAR sensor because it partially blocks the field of view of the LiDAR sensor due to the solid material of the grille.

To overcome the problem introduced by the grille pattern and to improve the operation of the sensor system, two or more LiDAR sensors may be optimally placed at a certain distance apart such that when the point cloud data for each sensor are merged together, the interference pattern of the grille is partially or totally removed. In other words, one LiDAR sensor may "see" regions of the scene that are blocked on the other sensor and vice versa. The perception processing software may then combine data from the multiple point clouds to achieve a relatively unobstructed data set.

A method for imaging a scene in front of a vehicle may include: receiving, via a processing device and a memory, a first point cloud from a first LiDAR sensor mounted at a first location behind a vehicle grille, the first point cloud representing the scene in front of the vehicle, wherein as a result of the grille the scene represented by the first point cloud data may be partially occluded with a first pattern of occlusion receiving, via the processing device and the memory, a second point cloud from a second LiDAR sensor mounted at a second location behind the vehicle grille combining the first and second point clouds to generate a composite point cloud data set, wherein the first location of the first LiDAR sensor may be located relative to the second location of the second LiDAR sensor such that when a point cloud data for the first optical sensor and the second optical sensor are combined, the first pattern of occlusion may be at least partially compensated; and processing the combined point cloud data set.

The method further include registering the second point cloud with the first point cloud prior to combining the point clouds.

The first pattern of occlusion may include an interference pattern of the grille. The first pattern of occlusion may include a blind spot caused by the grille in the field of view of the first LiDAR sensor. As a result of the grille the scene represented by the second point cloud data may be partially occluded with a second pattern of occlusion.

The first location of the first LiDAR sensor may be located relative to the second location of the second LiDAR sensor so that an overlap of the first pattern of occlusion with the second pattern of occlusion may be reduced or minimized.

In some embodiments, the first pattern of occlusion may be at least partially compensated when occlusions of the first pattern of occlusion are reduced in the combined point cloud data sets. In various embodiments, the first pattern of occlusion may be at least partially compensated when occlusions of the first pattern of occlusion are eliminated in the combined point cloud data sets.

A system for imaging a scene in front of a vehicle may include: A plurality of LiDAR sensors an object detection circuit communicatively coupled to the LiDAR sensors and comprising a processor and a memory, the memory comprising a plurality of instructions, which when executed by the processor cause the object detection circuit to perform the operations comprising: receiving a first point cloud from a first LiDAR sensor mounted at a first location behind a vehicle grille, the first point cloud representing the scene in front of the vehicle, wherein as a result of the grille the scene represented by the first point cloud data may be partially occluded with a first pattern of occlusion receiving a second point cloud from a second LiDAR sensor mounted at a second location behind the vehicle grille combining the first and second point clouds to generate a composite point cloud data set, wherein the first location of the first LiDAR sensor may be located relative to the second location of the second LiDAR sensor such that when a point cloud data for the first optical sensor and the second optical sensor are combined, the first pattern of occlusion may be at least partially compensated for; and processing the combined point cloud data set.

The operations further comprise registering the second point cloud with the first point cloud prior to combining the point clouds.

The system the first pattern of occlusion may include an interference pattern of the grille. As a result of the grille, the scene represented by the second point cloud data may be partially occluded with a second pattern of occlusion. The first location of the first LiDAR sensor may be located relative to the second location of the second LiDAR sensor so that an overlap of the first pattern of occlusion with the second pattern of occlusion may be reduced or minimized.

The first pattern of occlusion may include a blind spot caused by the grille in the field of view of the first LiDAR sensor.

In some embodiments, the first pattern of occlusion may be at least partially compensated when occlusions of the first pattern of occlusion are reduced in the combined point cloud data sets. In various embodiments, the first pattern of occlusion may be at least partially compensated when occlusions of the first pattern of occlusion are eliminated in the combined point cloud data sets.

A method for determining placement of a plurality of sensors behind a grille of a vehicle may include: receiving a data file describing a pattern of features of the grille of the vehicle determining a placement of a first sensor of the plurality of sensors behind the grille of the vehicle modeling operation of the first sensor behind the grille of the vehicle to determine a pattern of occlusions of the first sensor based on the data file describing the pattern of features of the grille of the vehicle based on a field-of-view of the plurality of sensors and parameters of the pattern of features (e.g., slats) of the grille, determining a placement of the second sensor of the plurality of sensors behind the grille of the vehicle such that when a point cloud data for the first optical sensor and the second optical sensor are combined, the first pattern of occlusion may be at least partially compensated in the combined data.

The first pattern of occlusion may be at least partially compensated when occlusions of the first pattern of occlusion are reduced in the combined point cloud data sets. The first pattern of occlusion may be at least partially compensated when occlusions of the first pattern of occlusion are eliminated in the combined point cloud data sets.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Various embodiments of the disclosed technology relate to placement of two or more LiDAR sensors are disposed behind the grille of a vehicle. The grille causes an interference pattern in the resulting point cloud data for each LiDAR sensor because it partially blocks the field of view of the LiDAR sensor due to the solid material of the grille.

To overcome the problem introduced by the grille pattern and to improve operation of the processing system, two or more LiDAR sensors are optimally placed at a certain distance apart such that when the point cloud data for each sensor are merged together, the interference pattern of the grille is partially or totally removed. In other words, one LiDAR sensor may "see" regions of the scene that are blocked on the other sensor and vice versa. The image processing software may then combine data from the multiple point clouds to achieve a relatively unobstructed data set. This may represent an improvement over conventional technologies in that data can be combined and utilized with blind spots being reduced or eliminated.

The systems and methods disclosed herein may be implemented with any number of different autonomous or semi-autonomous vehicles and vehicle types. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

Figure 1:
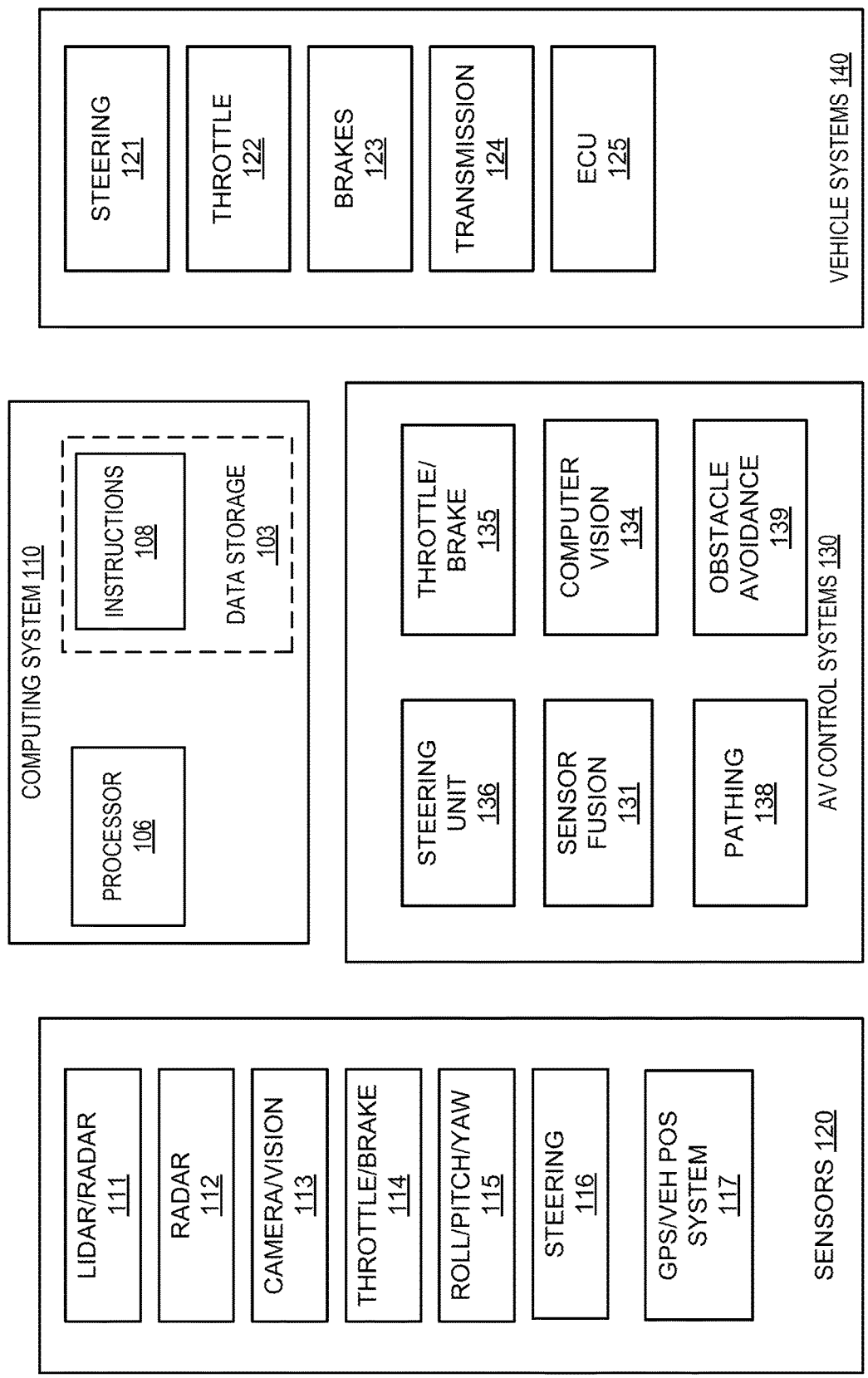
FIG. 1 illustrates an example autonomous or semi-autonomous vehicle with which embodiments of the disclosed technology may be implemented.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include LiDAR 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as LiDAR 111, RADAR 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
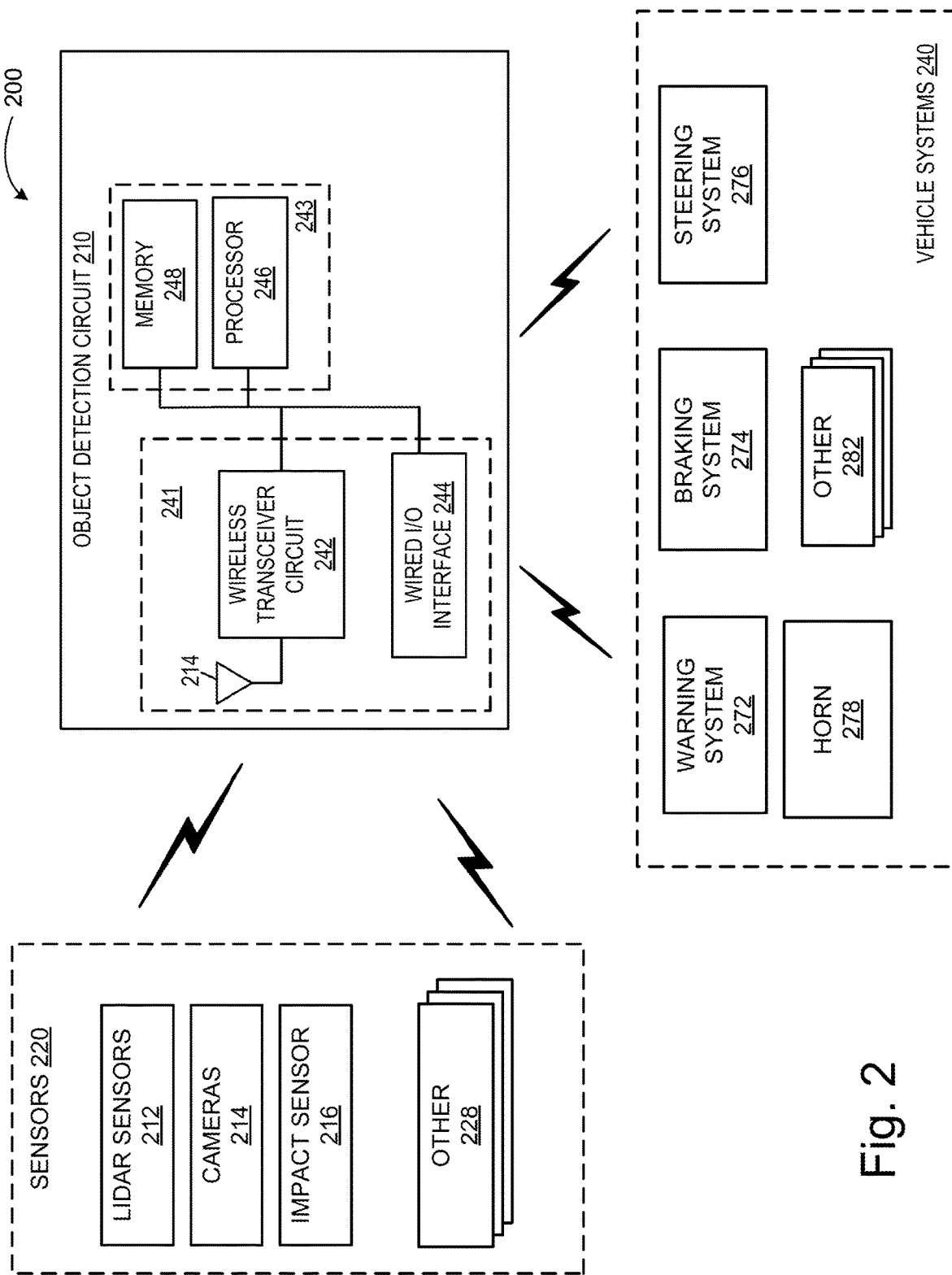
FIG. 2 is a diagram illustrating an example system for object detection using sensors placed to reduce or eliminate occlusions in accordance with various embodiments.

FIG. 2 is a diagram illustrating an example system for object detection using sensors placed to reduce or eliminate occlusions in accordance with various embodiments. In this example, the system of the subject vehicle includes sensors 220, object detection circuit 210 and vehicle systems 240. In the illustrated example, sensors 220 include a plurality of LiDAR systems 212, one or more sensors (e.g., cameras or LiDAR sensors) 214, one or more impact sensors 216 and other sensors 228 as may be appropriate for sensor placement or object detection in various implementations.

LiDAR system 212 includes light emitters and detectors to collect information surrounding the vehicle (or other robotics or automated system). In operation, LiDAR system 212 generates light beams, such as laser light beams, that are emitted in an arc up to 360° surrounding the vehicle (although grille mounted sensors would not benefit from a full 360° view). The transmitted light is reflected by objects in the environment of the vehicle and the reflections are returned to photodetectors of LiDAR system 212 where they are captured. The reflections are converted into electrical signals by any array of photodetectors, which can be implemented as photodiodes, avalanche photodiodes or other photodetector systems.

Timing information can be used to measure the time-of-flight of the optical signal from its source at LiDAR system 212 the object off of which it bounces and back to the photodetector where its reflection is received. This time-of-flight can be used to measure the distance from the vehicle (from LiDAR system 212) to the object. A 3D LiDAR system, therefore, can capture two-dimensional data using photodetectors arranged in rows and columns and the third dimension, distance, determined based on the time-of-flight.

LiDAR system 212 can be implemented using any of a number of different LiDAR technologies including electromechanical LiDAR and solid-state LiDAR. LiDAR system 212 can be implemented and configured to provide the system with 150°-180° of visibility toward the front of the subject vehicle, although other fields of view can be provided. LiDAR system 212 can be implemented with a relatively high degree of accuracy (e.g., on the order of +/−2 cms).

Data from LiDAR system 212 can be used to generate three-dimensional maps and point clouds that can be used by the autonomous vehicle or other robotic or automated system to navigate it surrounding environment. The LiDAR system can provide information to determine the bounds of the lane, the presence and location of surrounding vehicles, pedestrians and other objects, the presence location of traffic signals, and so on. In addition to detecting the presence and location of objects, information from LiDAR system 212 can also be used to track obstacles and other objects like vehicles, pedestrians, and so on.

Data from LiDAR system 212 can include a processing system or other circuit implemented to generate point clouds from the data collected by the sensors. Point clouds can comprise a set of 3D points corresponding to part of a scene or a whole scene and can be compensated by the vehicle motion during the accumulation period of the frame. Each frame can be instantaneously captured (such as, e.g., using flash LiDAR or a global shutter camera) or accumulated over a full rotation of a sensor. This data can include sensor data from an array of sensors at LiDAR system 212 as well as range data. The LiDAR system can be implemented to collate the information collected from the sensors to generate the three-dimensional point cloud map. For example, the system can be configured to stitch together image information collected from the rows and columns of sensors of LiDAR system 212 along with the range information for each pixel. Deep learning algorithms can be trained and used to label point cloud data collected by LiDAR system 212. The point cloud can be stored in any of a number of different point cloud file formats such as those used for 3D modeling.

Cameras 214 may also be included to capture image data of the environment surrounding the vehicle. For object detecting and tracking solutions during forward vehicle motion, cameras 214 may be implemented as a forward facing cameras to capture image information of the environment in front of the vehicle. Cameras can be configured with image sensors to operate in any of a number of different spectra including, for example, the visible spectrum and the infrared spectrum. Data from cameras 214 may be used, for example, to detect objects. The system can be configured to utilize multisensor fusion to combine information from multiple sensors such as, for example, LiDAR sensors 212 and cameras 214.

Impact sensors 216 can be implemented as any of a number of different types of impact sensors including, for example, accelerometers to detect sudden deceleration as may be associated with a front end impact. Bumper mounted pressure sensors such as a pressure hose sensor may also be used. Such sensors may be used to detect impact with an object that might not result in sudden vehicle deceleration such as, for example, an impact with a pedestrian. While such sensors may gather data at a time that is too late to prevent impact with a pedestrian, they can trigger safety systems such as, for example, hood hinge actuators that can elevate the rear edge of the hood to prevent the pedestrian's head from hitting the engine block or deploying an external airbag.

Object detection circuit 210 may be used to trigger a vehicle reaction in response to detection of a pedestrian or other object in the path of the vehicle. Particularly, object detection system 210 may send a signal to actuate one or more vehicle systems 158 as appropriate based on the detected impending incident. In this example, vehicle systems 240 include warning systems 272, vehicle braking system 274, vehicle steering system 276, vehicle horn 278 and other vehicle systems 282.

Object detection circuit 210 in this example includes a communication circuit 241 and a detection circuit 243 (including a processor 246 and memory 248 in this example). Components of object detection circuit 210 are illustrated as communicating with each other via a data bus, although other communication in interfaces can be included.

Processor 246 can include one or more GPUs, CPUs, microprocessors, or any other suitable processing system. Processor 246 may include a single core or multicore processors. The memory 248 may include one or more various forms of memory or data storage (e.g., flash, RAM, etc.) that may be used to store the calibration parameters, images (analysis or historic), point parameters, instructions and variables for processor 246 as well as any other suitable information. Memory 248, can be made up of one or more modules of one or more different types of memory, and may be configured to store data and other information as well as operational instructions that may be used by the processor 246 to object detection circuit 210.

Although the example of FIG. 2 is illustrated using processor and memory circuitry, as described below with reference to circuits disclosed herein, decision circuit 243 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a object detection circuit 210.

Communication circuit 241 either or both a wireless transceiver circuit 242 with an associated antenna 214 and a wired I/O interface 244 with an associated hardwired data port (not illustrated). As this example illustrates, communications with object detection circuit 210 can include either or both wired and wireless communications circuits 241. Wireless transceiver circuit 242 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 242 and is used by wireless transceiver circuit 242 to transmit radio signals wirelessly to wireless equipment with which it is connected and to receive radio signals as well. These RF signals can include information of almost any sort that is sent or received by object detection circuit 210 to/from other entities such as sensors 220 and vehicle systems 240.

Wired I/O interface 244 can include a transmitter and a receiver (not shown) for hardwired communications with other devices. For example, wired I/O interface 244 can provide a hardwired interface to other components, including sensors 152 and vehicle systems 158. Wired I/O interface 244 can communicate with other devices using Ethernet, CAN bus, or any of a number of other wired communication protocols whether standardized, proprietary, open, point-to-point, networked or otherwise.

If an object is detected, object detection circuit 210 may trigger warning system 272 to alert the driver that there is an object in the path of the vehicle and the driver must act to avoid impact. Object detection circuit 210 may trigger braking system 274 to apply the vehicle's brakes to avoid hitting the pedestrian. Object detection circuit 210 may trigger steering system 276 to initiate evasive steering maneuvers to avoid hitting the pedestrian. Object detection circuit 210 may actuate the vehicle's horn 278 to warn the pedestrian of the approach of the vehicle. Similarly, object detection circuit 210 may actuate other vehicle systems 282 as may be appropriate to attempt to mitigate or avoid the collision.

Operation of object detection circuit 210 may be improved if sensors that provide information for object detection and tracking (e.g., LiDAR sensors of LiDAR system 212) can provide data representing an unobstructed view of the scene in front of the vehicle. Accordingly, as described above, various embodiments may determine appropriate sensor placement behind the grille of the vehicle to minimize or eliminate occlusions or blind spots in the sensor data.

Figure 3:
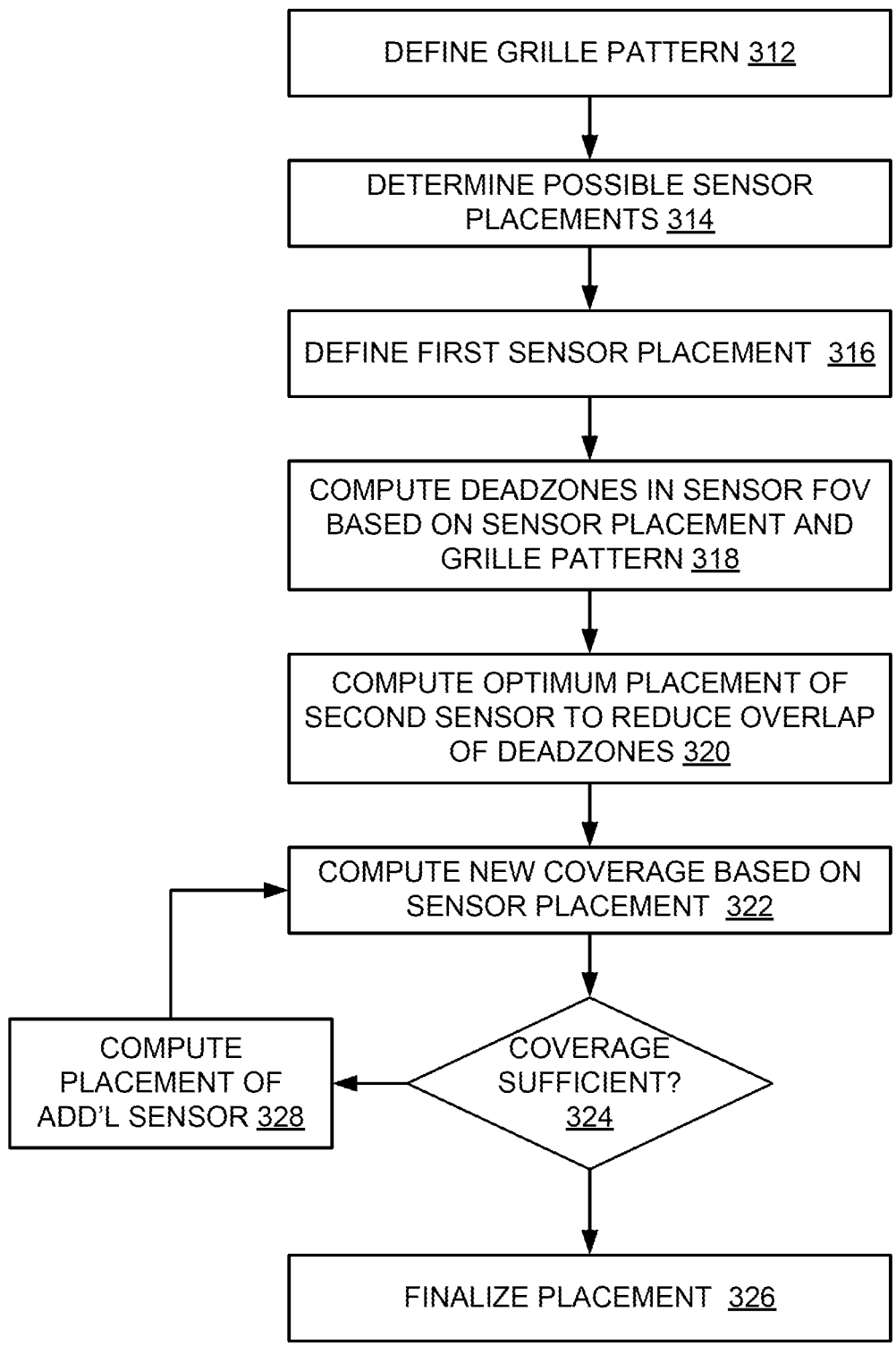
FIG. 3 is a diagram illustrating an example process for determining sensor placement to minimize her eliminate occlusions in accordance with various embodiments.

FIG. 3 is a diagram illustrating an example process for determining sensor placement to minimize or eliminate occlusions in accordance with various embodiments. Referring now to FIG. 3, at operation 312 the grille pattern for the vehicle is defined. Almost every vehicle includes a grille at the front of the vehicle whose primary purpose is to protect the radiator and engine from damage. Grilles have long been used by manufacturers to distinguish their various product offerings and are often used as a brand identifier. Different vehicles have different patterns of slats (e.g., bars and spaces) for the vehicle grille. Some vehicles use primarily horizontal slats, some use primarily vertical slats, some use cross member patterns of slats, some use a honeycomb pattern of slats and so on. One further example is the famous spindle grille on the Lexus LS model that features a span of interlocking Lexus 'L' motif slats.

Accordingly, files representing the grille pattern for the subject vehicle can be fed into the system. These files can include data indicating the grille pattern of occlusion (e.g., a pattern of occlusions or obstructions (e.g., slats) and openings (e.g., spaces between the slats)) in the vehicle grille. In an example of slats and openings, this data can include parameters such as length, width and depth of the slats, orientation of slats, spacing between slats, curvature of slats, placement of stats relative to the vehicle structure, and so on. The obstructions might not only be from slats that make up the grille, but also other obstructions such as a vehicle badge or logo on the grille, cameras mounted on the grille, fascia structural members, component mounting brackets, and so on.

Operation 314, the system determines possible sensor placements for the LiDAR or other sensors that will be used for pedestrian or other object detection and tracking. The system can take into account available mounting locations, available space for a sensor, appropriate sensor height and so on to define one or more locations at or within which the sensors may be mounted behind the grille.

At operation 316 system determines a placement location for the first of a plurality of the sensors. The system can determine this location using the information obtained in operation 314. With the first placement location determined, the system can now compute dead zones in the sensor field of view based on sensor placement and the vehicle grille pattern. This is shown in operation 318. The system can also compute other dead zones based on other obstructions in the field of view such as, for example, from vehicle badging, cameras, or other objects that may obstruct the view of the sensor.

At operation 320, the system computes an optimal placement of the second sensor to reduce or eliminate an overlap of dead zones. In other words, the system computes a placement of the second sensor such that the grille pattern obstructions do not occur in the same places of the scene they occur for the first sensor. Accordingly, the second sensor can capture data that is otherwise obstructed from view of the first sensor.

At operation 322, the system computes scene coverage based on sensor placement. In various embodiments, the system can register the point clouds such that they are in alignment and determine the percentage of the scene that is impacted by dead zones from both sensors in the same location on the scene. In some embodiments, the system can model various sensor placement scenarios and compute coverage to find a solution that optimizes coverage (e.g., reduces common dead zones) within the possible sensor placement locations.

If sensor coverage with two sensors is insufficient (i.e., too many common dead zones remain after optimized placement), the system may be configured to compute placement of an additional sensor to reduce or eliminate remaining dead zones. This is illustrated in operations 324 and 328. If additional sensor is added, coverage can be computed based on placement of this additional sensor at operation 322. This cycle can continue until sufficient coverage is achieved. The requirements for sufficient coverage may be determined by vehicle or system designers and may depend on vehicle type, intended vehicle use, location of vehicle use and so on. For example in some applications, 90% coverage (i.e., only 10% of the scene is occluded by dead zones) may be deemed sufficient. In other applications, 91%, 92%, 93%, 94%, 95%, 96%, 97%, 98%, 99% or 100% may be required. In still other applications other coverage requirements may be determined.

If it is determined in operation 324 at the coverage achieved by the sensors and their placement is sufficient, placement can be finalized at operation 326.

Figure 4:
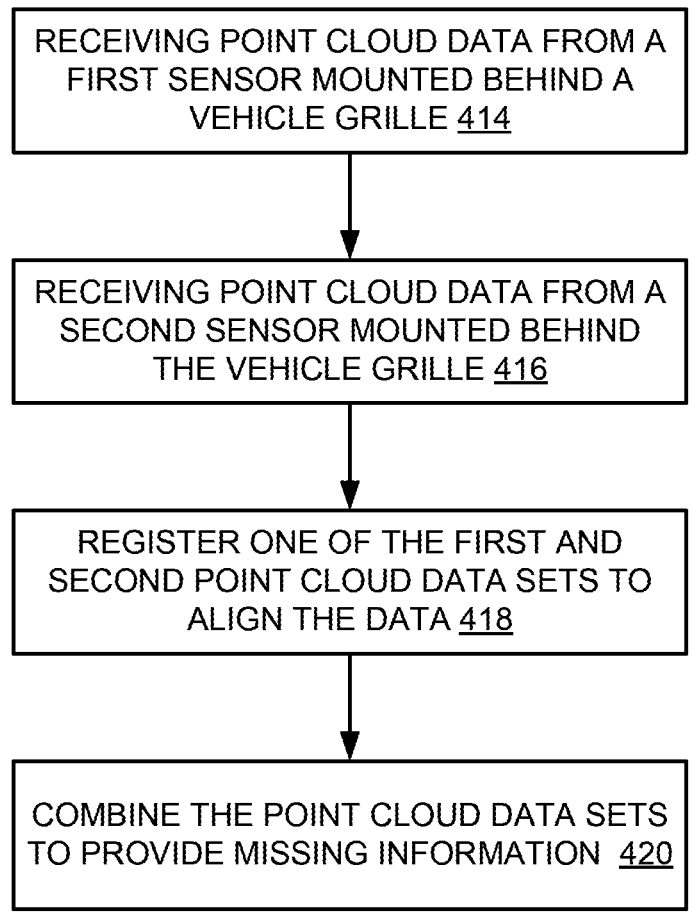
FIG. 4 illustrates an example process for data collection using sensors with placement to minimize or eliminate occlusions in accordance with various embodiments.

FIG. 4 illustrates an example process for data collection using sensors with placement to minimize or eliminate occlusions in accordance with various embodiments. Referring now to FIG. 4, at operation 414, the system, for example, object detection system 210, receives data from a first sensor mounted behind a vehicle grille. Particularly, in one application, the system receives point cloud data from a first sensor such as a LiDAR sensor mounted behind the vehicle grille.

At operation 416, the system receives data from a second sensor mounted behind a vehicle grille. Particularly, in one application, the system receives point cloud data from a second sensor such as a LiDAR sensor mounted behind the vehicle grille.

At operation 418, the system registers one of the first and second point cloud data sets with the other of the first and second point cloud data sets to align the data. This may involve a transformation such as, for example, a scaling, rotation or translation, that aligns the two point clouds. This operation may be performed in conjunction with other sensors of the vehicle at the same time to assist in registration. The operation can rely on sensor locations referenced to the center of the rear axle, which is generally the pivot point of the vehicle when it is turning.

At operation 420 the system combines the point cloud data sets to compensate for the occlusions in the first pattern of occlusions such as by, for example, eliminating, or minimizing the amount of, blind spots accounting for missing information in the point cloud data sets. For example, in embodiments where two or more sensors are mounted behind the grille of the vehicle to minimize or eliminate blind spots in the data, the point cloud data sets can be combined to provide a single data set with few or no occlusions. For example, the sensors can be mounted such that an overlap of the pattern of occlusion of the first sensor with the second pattern of occlusion with the second sensor is reduced or minimized.

In some applications, the system can identify data points corresponding to the vehicle grille or other vehicle obstructions based on distance. The system may further be configured to eliminate from consideration (or give less weight to) occlusions that occur below a threshold distance from the sensors. For example, based on the mounting position of the sensor behind the grille, the system can be configured to mark any data having a range less than the distance from the sensor to the outer surface of the grille (which may vary based on angle) as an obstructed data point. Accordingly, the system can combine the data sets such that obstructed data points in the first data set are filled by unobstructed data points in the second data set, or vice versa.

In some embodiments, masking may also be used to eliminate occlusions. Masking can be a useful tool where the sensor is rigidly mounted to the vehicle and the occlusions from other fixed vehicle components will not move in the field of view of the sensors. For example, regions that correspond to occlusions can be identified in advance for the sensor. These regions of invalid data can be computed off-line and removed with a simple masking operation in real time.

In some applications, such as where a grill is uniform across its width, placement may be accomplished by computing relative placement of each sensors (e.g., in terms of an x,y offset value) and then determine mounting locations for both that achieve this relative placement.

In further applications placement may be accomplished by determining regions behind the grill within which it is possible or practical or otherwise acceptable to mount the sensors, and then optimize relative placements within those acceptable regions. For example, mounting issues, height restrictions, environmental concerns, severe obstructions or other issues might constrain the available mounting locations for either or both sensors. In such cases, placement may be accomplished by determining what these available acceptable regions are and working within those regions to obtain relative placement that achieves an optimal solution.

Figure 5:
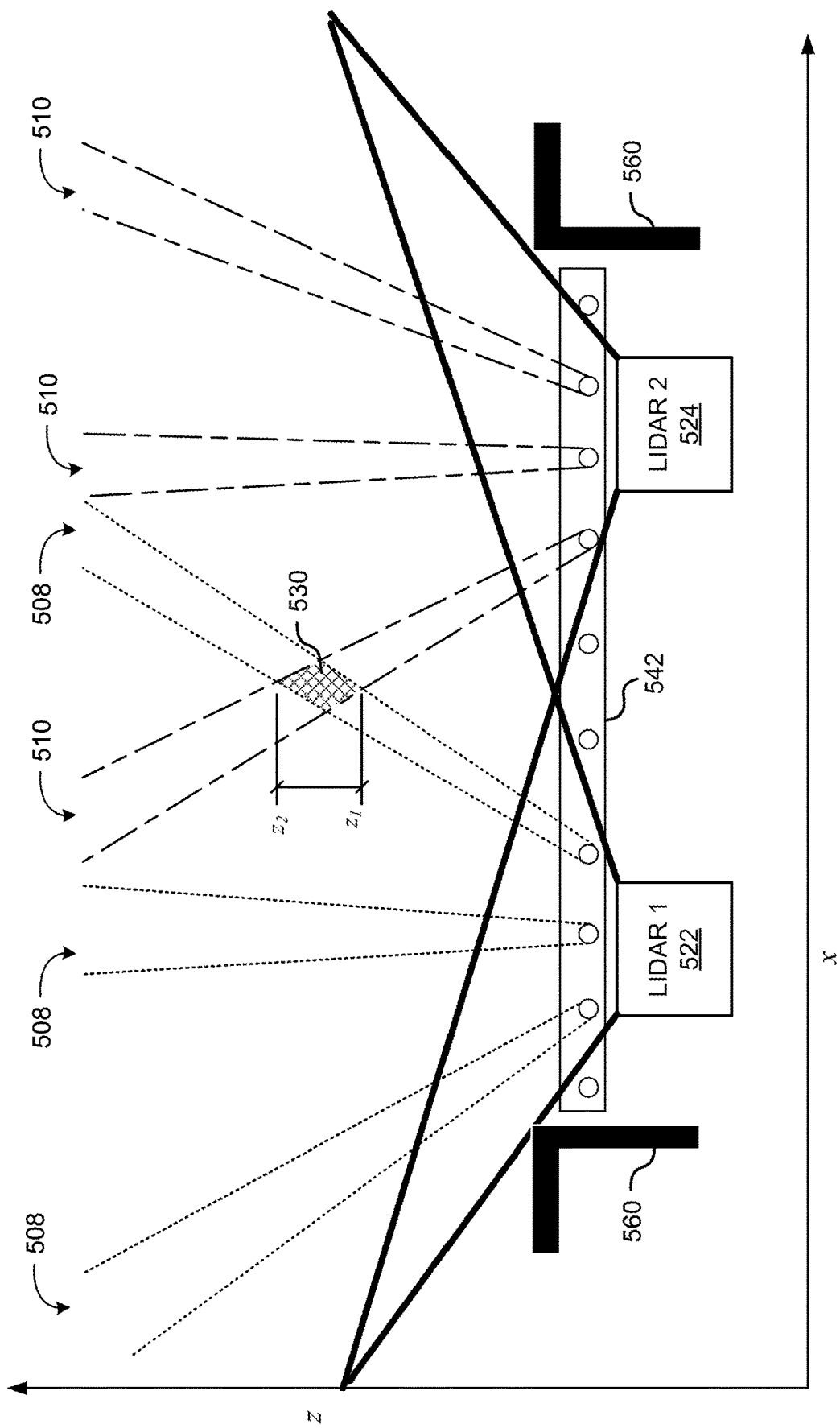
FIG. 5 is a diagram illustrating an example of using two sensors to eliminate most occlusions of a point cloud data set in accordance with various embodiments.

FIG. 5 is a diagram illustrating an example of using two sensors to eliminate most occlusions of a point cloud data set in accordance with various embodiments. With reference now to FIG. 5, this example illustrates a top-down (or bottom-up) view of two LiDAR sensors 522, 524 mounted behind a grille 542 of the vehicle. Grille 542 is mounted between left and right portions of front fascia 560 (e.g., headlight surrounds adjacent grille 542. Grille 542 includes a plurality of vertical slats illustrated by circles in front of (above on the drawing sheet) LiDAR sensors 522, 524. Point cloud data from LiDAR system is typically three-dimensional data and data points are returned with coordinates depending on the coordinate system. For example coordinates may be X, Y, Z for the rectangular or global coordinate system, r,θ,φ for the spherical coordinate system, and so on. This example of FIG. 5 illustrates a "slice" or plane of the Y axis in two dimensions, X (left to right) and Z (range).

In this example, LiDAR sensor 522 is obstructed by three slats of grille 542 resulting in an image occlusion pattern in the Y plane as illustrated by dashed lines 508. Similarly, LiDAR sensor 524 is obstructed by three different slats of grille 542, resulting in an image occlusion pattern in the Y plane as illustrated by dashed lines 510. As seen in this example, LiDAR sensors 522, 524 are placed such that there is minimal overlap of occlusions minimizing the blind spot in a merged image of the two sensors. Particularly, for the bulk of the Z dimension in the Y plane in this example, there is no overlap of occlusions except for shaded area 530 which is occluded from depth Z1 to depth Z2 for both sensors. It is noted that a first sensor cannot make up for occlusions of the second sensor if those occlusions are outside of the field of view of the first sensor, and vice versa. This may be addressed by providing a wider field of view for the sensors.

Accordingly, LiDAR sensors 522, 524 are placed such that when a point cloud data for the LiDAR sensors 522 524 are combined, the first pattern of occlusion caused by the grille in front of LiDAR sensor 522 is at least partially removed.

Figure 6:
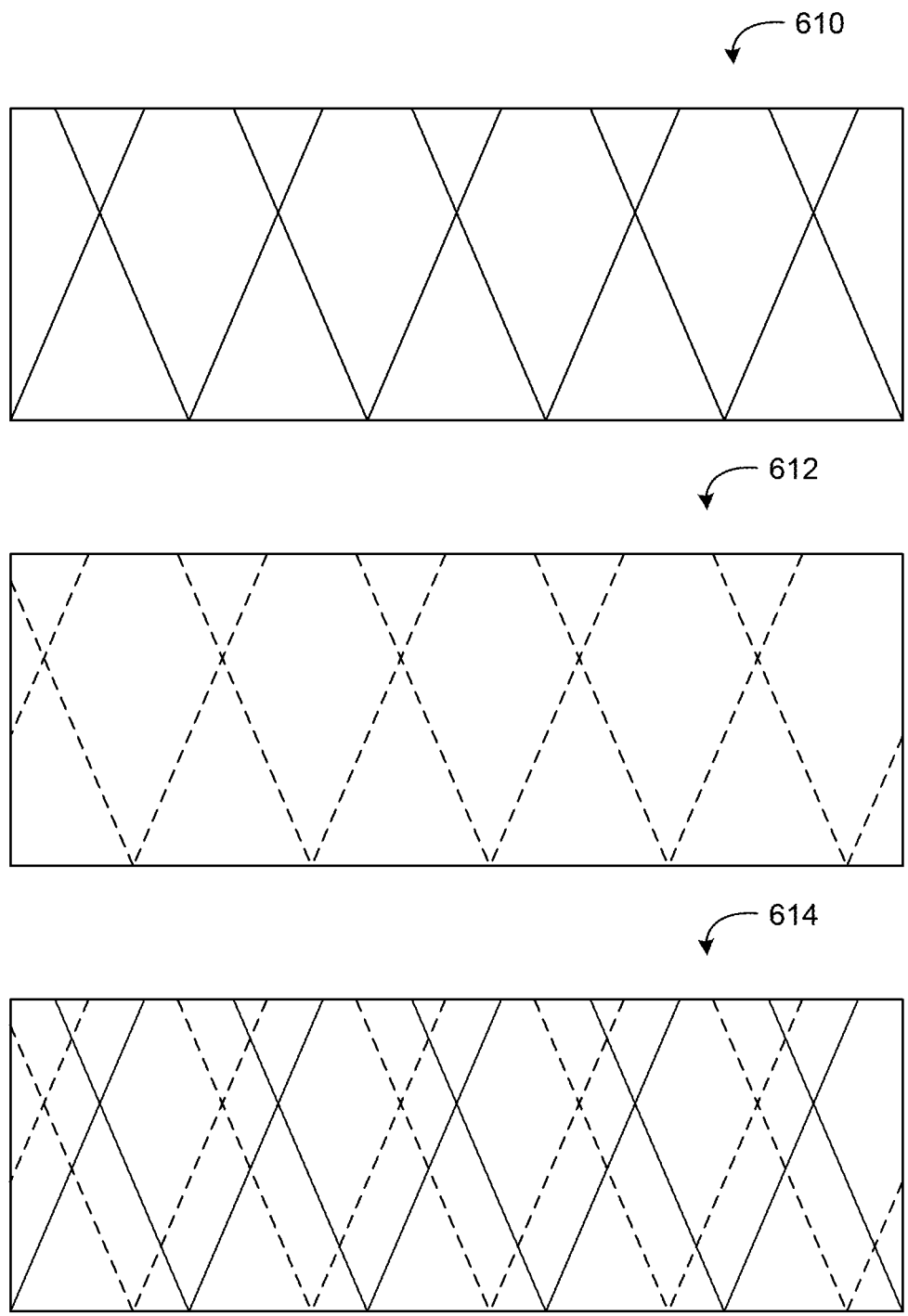
FIG. 6 is a diagram illustrating another example of using two sensors to eliminate most occlusions of a point cloud data set in accordance with various embodiments.

FIG. 6 is a diagram illustrating another example of using two sensors to eliminate most occlusions of a point cloud data set in accordance with various embodiments. Referring now to FIG. 6, this example illustrates a scene in a "slice" of the Z-axis in two dimensions, X and Y. 610 illustrates an example of a pattern of occlusion caused by a grille in front of a first sensor such as a LiDAR sensor. In this example, the grille creates a pattern of occlusion on this plane of the z-axis as a series of X's in the illustrated positions as shown by the solid lines within the rectangle.

612 illustrates an example of a pattern of occlusion caused by the grille in front of a second sensor such as a LiDAR sensor. In this example, the grille creates a pattern of occlusion on this plane of the z-axis as a series of X's in the illustrated positions as shown by the dashed lines within the rectangle.

614 illustrates an example of the two patterns of occlusion placed on top of one another. As this example illustrates, the sensors are placed such that the patterns of occlusion do not overlap one another. Accordingly, most of the information missing from one sensor as a result of the occlusions is captured by the other sensor and can be recovered when the two data sets are merged. In this example, the only occlusions that would remain would be the "points" at the intersections of the solid lines with the dashed lines.

Figure 7:
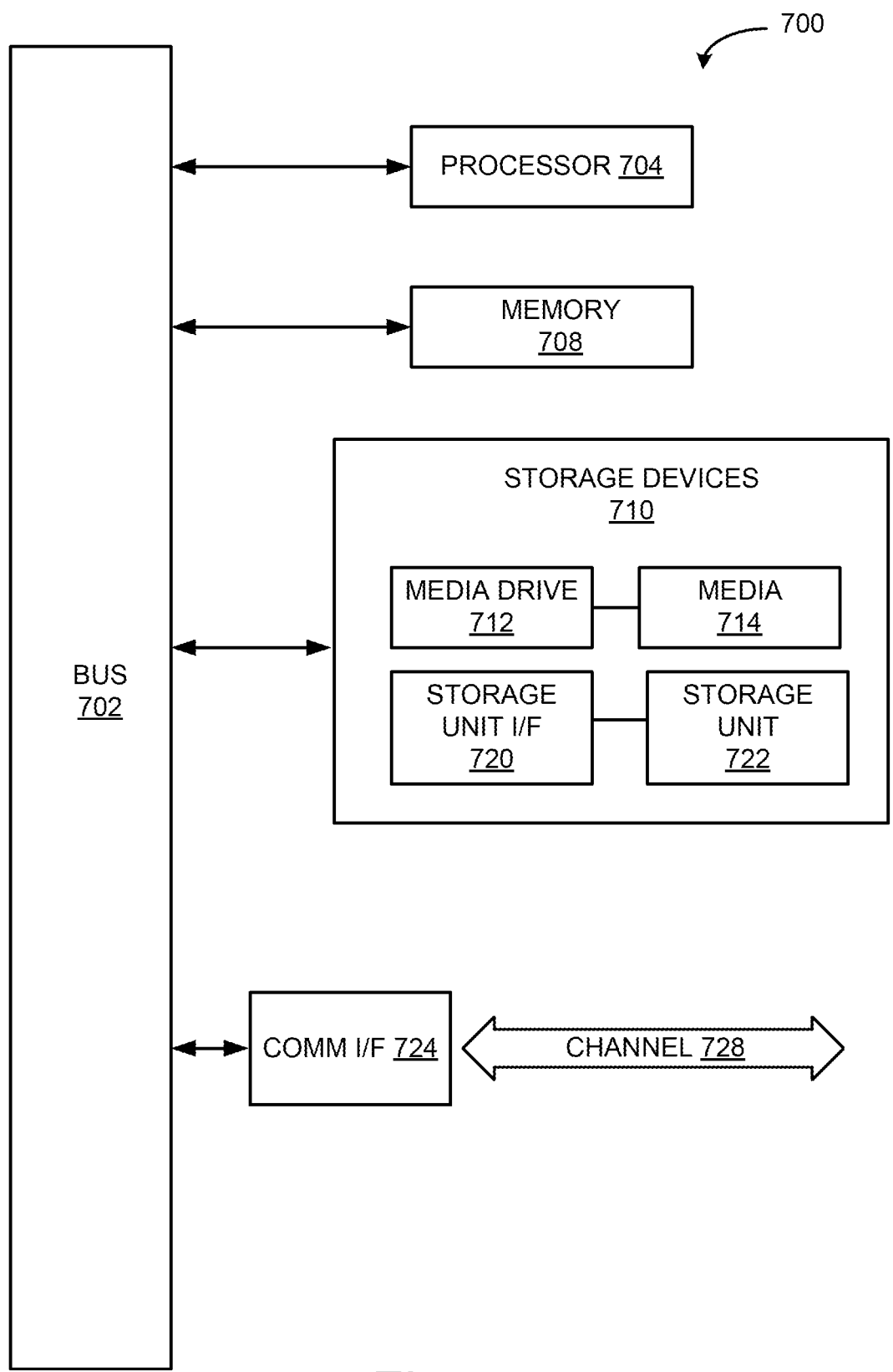
FIG. 7 is an example computing component that may be used to implement various features of embodiments described in the present disclosure.

As used herein, the term module may be used describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. Various components described herein may be implemented as discrete module or described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. One such example computing component is shown in FIG. 7. Various embodiments are described in terms of this example-computing component 500. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

It should be noted that the terms "optimize," "optimal," "optimum" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for imaging a scene in front of a vehicle, the method comprising:
receiving, via a processing device and a memory, first sensor data from a first optical sensor mounted at a first location behind a structure of the vehicle, the first sensor data representing the scene in front of the vehicle, wherein as a result of the structure the scene represented by the first sensor data is partially occluded with a first pattern of occlusion, and wherein the structure comprises at least one of: a grille of the vehicle, a badge of the vehicle, a logo of the vehicle, a camera mounted on the vehicle, a fascia structural member of the vehicle, and a component mounting bracket of the vehicle;
receiving, via the processing device and the memory, a second sensor data from a second optical sensor mounted at a second location behind the structure, wherein as a result of the structure, the scene represented by the second sensor data is partially occluded with a second pattern of occlusion;
combining the first and second sensor data to generate a composite sensor data set, wherein the first location of the first optical sensor is located relative to the second location of the second optical sensor such that when sensor data for the first optical sensor and the second optical sensor are combined, the first pattern of occlusion is at least partially compensated, and further wherein the first location of the first optical sensor is located relative to the second location of the second optical sensor such that an overlap of the first pattern of occlusion with the second pattern of occlusion is reduced or minimized; and
processing the combined sensor data set.

2. The method of claim 1, further comprising registering the second sensor data with the first sensor data prior to combining the first and second sensor data.

3. The method of claim 1, wherein the first pattern of occlusion comprises an interference pattern of the structure.

4. The method of claim 1, wherein the first pattern of occlusion comprises a blind spot caused by the structure in the field of view of the first optical sensor.

5. The method of claim 1, wherein the first pattern of occlusion is at least partially compensated when occlusions of the first pattern of occlusion are reduced in the combined sensor data sets.

6. The method of claim 1, wherein the first pattern of occlusion is at least partially compensated when occlusions of the first pattern of occlusion are eliminated in the combined sensor data sets.

7. The method of claim 1, wherein at least one of the first optical sensor and the second optical sensor comprises at least one of: a LiDAR sensor, a camera, and a radar sensor.

8. A system for imaging a scene in front of a vehicle, the system comprising:
a plurality of optical sensors;
an object detection circuit communicatively coupled to the optical sensors and comprising a processor and a memory, the memory comprising a plurality of instructions, which when executed by the processor cause the object detection circuit to perform the operations comprising:
receiving a first sensor data from a first optical sensor mounted at a first location behind a structure of the vehicle, the first sensor data representing the scene in front of the vehicle, wherein as a result of the structure the scene represented by the first sensor data is partially occluded with a first pattern of occlusion, and wherein the structure comprises at least one of: a grille of the vehicle, a badge of the vehicle, a logo of the vehicle, a camera mounted on the vehicle, a fascia structural member of the vehicle, and a component mounting bracket of the vehicle;
receiving a second sensor data from a second optical sensor mounted at a second location behind the structure, wherein as a result of the structure, the scene represented by the second sensor data is partially occluded with a second pattern of occlusion;
combining the first and second sensor data to generate a composite sensor data set, wherein the first location of the first optical sensor is located relative to the second location of the second optical sensor such that when a sensor data for the first optical sensor and the second optical sensor are combined, the first pattern of occlusion is at least partially compensated for, and further wherein the first location of the first optical sensor is located relative to the second location of the second optical sensor such that an overlap of the first pattern of occlusion with the second pattern of occlusion is reduced or minimized; and
processing the combined sensor data set.

9. The system of claim 8, wherein the operations further comprise registering the second sensor data with the first sensor data prior to combining the sensor data.

10. The system of claim 8, wherein the first pattern of occlusion comprises an interference pattern of the structure.

11. The system of claim 8, wherein the first pattern of occlusion comprises a blind spot caused by the structure in the field of view of the first optical sensor.

12. The system of claim 8, wherein the first pattern of occlusion is at least partially compensated when occlusions of the first pattern of occlusion are reduced in the combined sensor data sets.

13. The system of claim 8, wherein the first pattern of occlusion is at least partially compensated when occlusions of the first pattern of occlusion are eliminated in the combined sensor data sets.

14. The system of claim 8, wherein at least one of the first optical sensor and the second optical sensor comprises at least one of: a LiDAR sensor, a camera, and a radar sensor.

15. A method for determining placement of a plurality of optical sensors behind a structure of a vehicle, the method comprising:
receiving a data file describing a pattern of features of the structure of the vehicle;
determining a placement of a first optical sensor of the plurality of optical sensors behind the structure of the vehicle;
modeling operation of the first optical sensor behind the structure of the vehicle to determine a pattern of occlusion of the first optical sensor caused by the pattern of features of the structure, the modeling based on the data file describing the pattern of features of the structure;
based on a field-of-view of the plurality of optical sensors and parameters of the pattern of features of the structure, determining a placement of a second optical sensor of the plurality of optical sensors behind the structure such that when a sensor data for the first optical sensor and the second optical sensor are combined, the pattern of occlusion of the first optical sensor that is caused by the pattern of features of the structure is at least partially compensated in the combined data by data captured from the second optical sensor.

16. The method of claim 15, wherein the pattern of occlusion is at least partially compensated when occlusions of the pattern of occlusion are reduced in the combined sensor data sets.

17. The method of claim 15, wherein the pattern of occlusion is at least partially compensated when occlusions of the pattern of occlusion are eliminated in the combined sensor data sets.

* * * * *